H. REID.
BICYCLE STAND.
APPLICATION FILED AUG. 14, 1915.
1,207,327.
Patented Dec. 5, 1916.
2 SHEETS—SHEET 2.
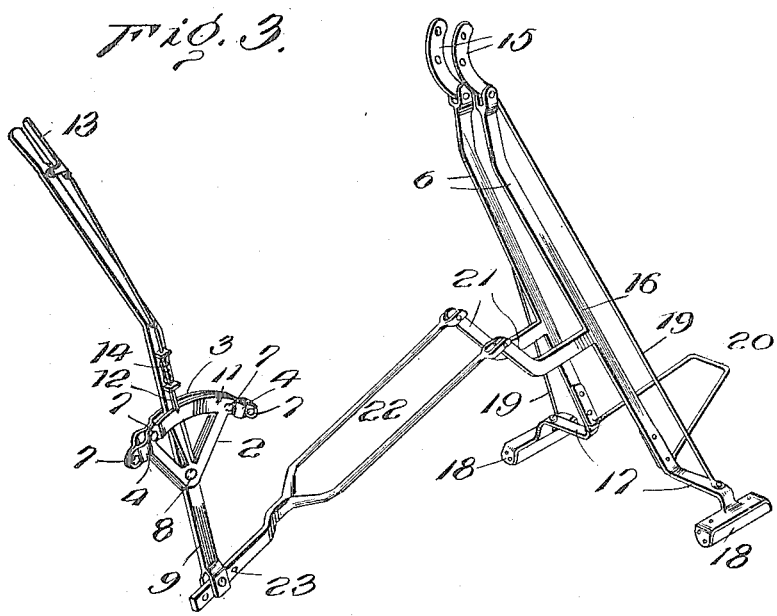
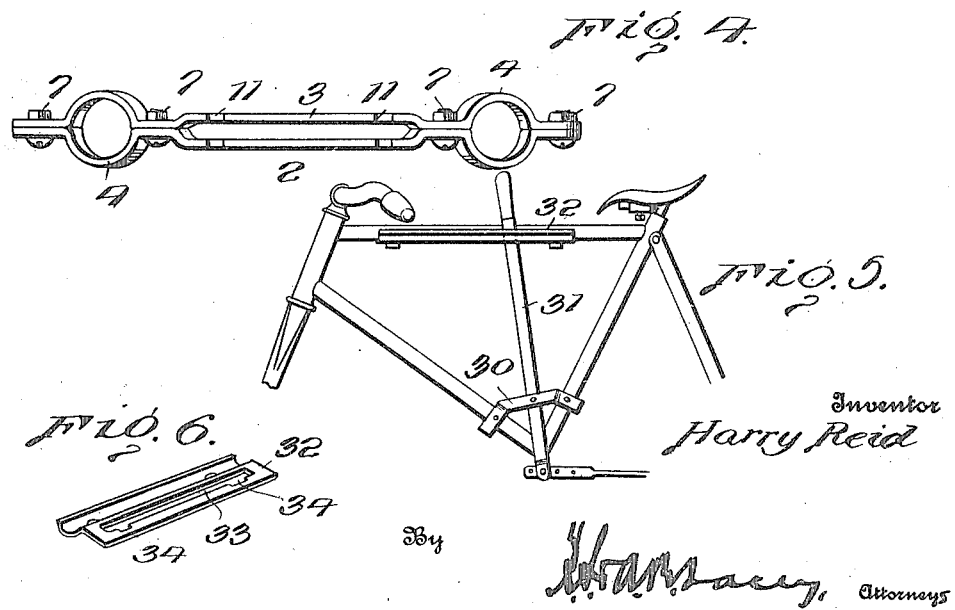
Inventor
Harry Reid

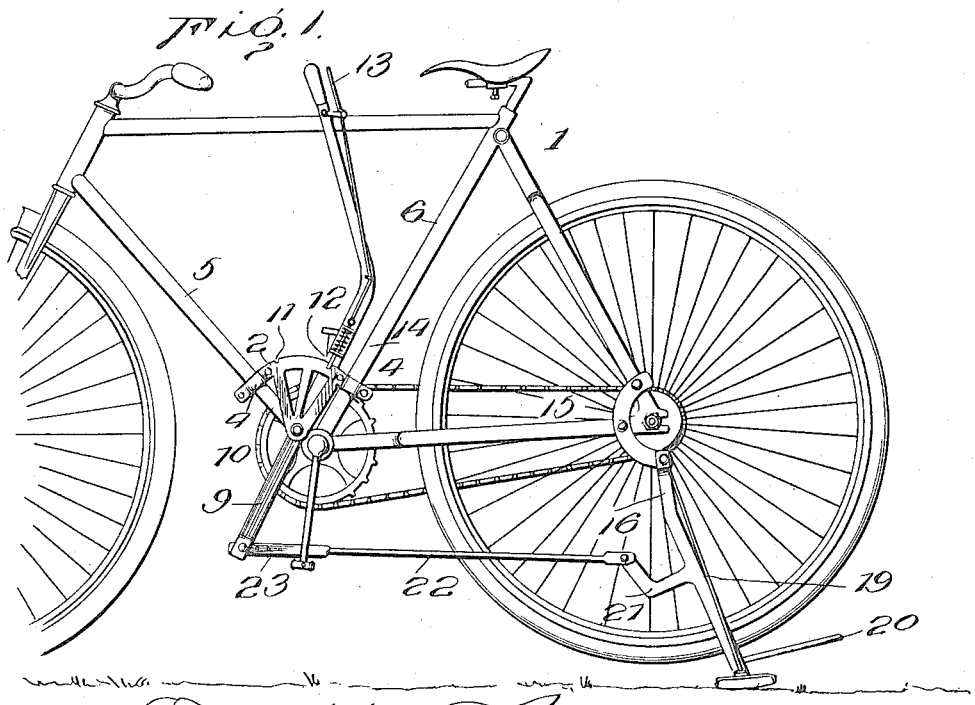
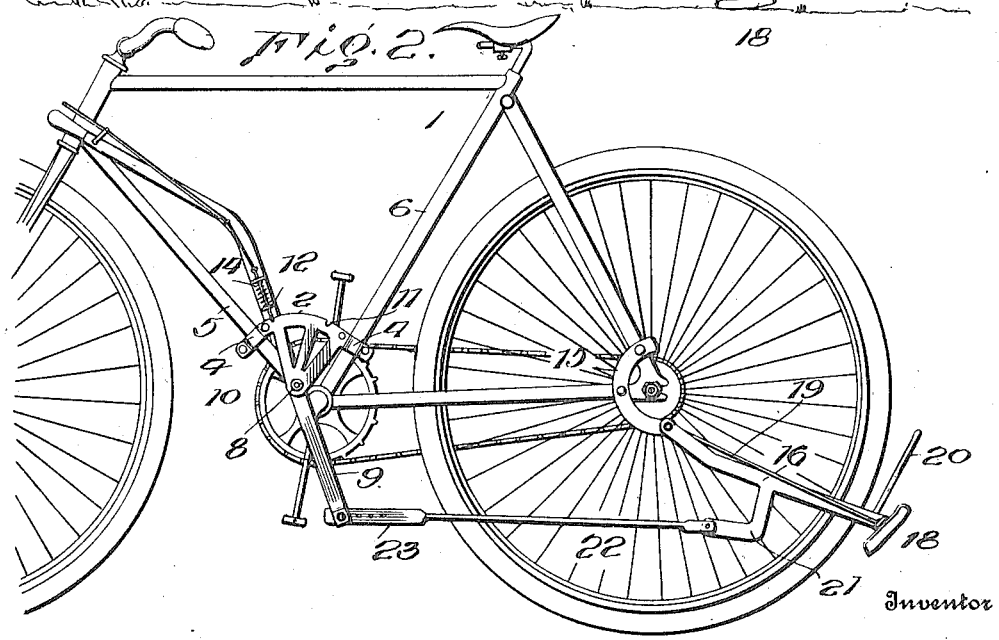

UNITED STATES PATENT OFFICE.

HARRY REID, OF CLINTON, INDIANA.

BICYCLE-STAND.

1,207,327. Specification of Letters Patent. Patented Dec. 5, 1916.

Application filed August 14, 1915. Serial No. 45,521.

*To all whom it may concern:*

Be it known that I, HARRY REID, a citizen of the United States, residing at Clinton, in the county of Vermilion and State of Indiana, have invented certain new and useful Improvements in Bicycle-Stands, of which the following is a specification.

This invention relates to bicycle supports and has for its object the provision of a simple, strong and efficient device which may be readily attached to a bicycle and utilized as a brake to arrest the travel of the bicycle, or as a stand to support the bicycle when not in use.
A particular object of the invention is to provide a device for the stated purpose which may be readily operated from the saddle and which will not interfere in any way with the ordinary use of the wheel.
Other incidental objects of the invention will appear as the description of the same proceeds and the invention resides in certain novel features which are illustrated in the accompanying drawings and which will be particularly pointed out in the claims following the detailed description.

In the drawings: Figure 1 is a side elevation of a portion of a bicycle having my improved support applied thereto and showing the same arranged to hold the bicycle when not in use. Fig. 2 is a similar view showing the device arranged to permit travel of the cycle. Fig. 3 is a perspective view of the support removed from the cycle.
Fig. 4 is a detail plan view of the locking segment. Figs. 5 and 6 are detail views showing a different manner of mounting the controlling lever.

The bicycle, indicated at 1, may be of any usual or preferred construction and may be a motor driven cycle or a wheel propelled by the rider, as illustrated. In carrying out my invention, I employ a segmental frame 2 which is provided with a longitudinal slot in its upper end and may be constructed as shown most clearly in Fig. 4 with mating sections having offset portions 3 to provide said slot and semi-circular portions 4 adjacent its ends to fit around members 5 and 6 of the cycle frame. Securing bolts 7 are inserted through these mating members at the ends thereof and between the semi-circular portions 4 and the offset portions 3 so as to securely clamp the segmental frame to the cycle frame, as illustrated in Figs. 1 and 2. At the lower end 8 of the segmental frame, I pivotally secure a lever 9 which should be of such length that its lower end will be below the crank hanger of the cycle and its upper end will be in convenient reach of the rider. It will also be understood that the segmental frame 2 is so disposed relative to the cycle frame that the lever 9 will be at the opposite side of the frame from the driving sprocket, indicated at 10. The segmental frame 2 is constructed with notches 11 in its upper edge which are adapted to be engaged by a latch or holding dog 12 which is mounted on the lever 9 and controlled through a handle 13 which is arranged to lie against the handle of the said lever as shown and as will be readily understood. A spring, indicated at 14, tends normally to hold the dog in engagement with one of the notches 11 and, when the handle 13 is pressed against the handle of the lever 9, the dog will be withdrawn from the segment against the tension of the said spring so that, when the handle is released, the dog will be at once automatically reëngaged in a notch of the segmental frame. To the rear forks of the cycle frame, on each side thereof and immediately in advance of the hub of the driving wheel, I secure by bolts, or in any other desired or preferred manner, bars or brackets 15 having their lower ends disposed below and slightly in rear of the rear hub of the cycle. To the lower extremities of these bars or brackets, I secure hangers or lever arms 16 which have their lower ends turned laterally so as to extend outwardly from the cycle, as shown at 17, and to the extremities of these lateral portions I secure shoes or brake members 18 which are adapted to bear directly upon the ground, as shown in Fig. 1, and thereby arrest the travel of the cycle or support the same if it be not in use. It will be readily understood that, inasmuch as one of these hangers and a shoe is provided at each side of the rear wheel, the bicycle will be supported in an upright position without any liability of its toppling over. A brace 19 is extended between the upper end of each hanger or lever arm 16 and the outer extremity of the lateral portion 17 so as to impart rigidity to the structure, and a bowed brace 20 is connected to the lower ends of the two hangers and extends rearwardly therefrom so as to connect them and prevent the spreading of the same and, at the same time, clear the cycle wheel. The hangers are provided between their upper and lower ends with forwardly projecting lugs or branches 21 to which are pivoted the rear ends of a fork 22 which has its front end pivoted to the lower end of the lever 9, and the said front end of the fork may be provided with a longitudinal series of openings 23 so as to adjust the throw of the device as may be needed.

It is thought the operation of my improved device will be readily understood from the foregoing description taken in connection with the accompanying drawings. When the cycle is in use the parts are disposed as shown in Fig. 2, the shoes or brakes being above the ground and in rear of the driving wheel, while the lever 9 will be thrown forward and its upper end will be below the handle bar. If it should be desired to stop the bicycle, the rider pulls the lever 9 toward himself to the position shown in Fig. 1 and thereby causes the lower end of the lever to swing forwardly and exert a pull upon the hangers 16 through the fork 22. This forward pull upon the hangers 16 will cause them to swing about their pivotal connection with the bars or brackets 15 and force the shoes or brakes 18 against the ground, as shown in Fig. 1. If only a slight pressure be exerted upon the shoes, travel will be retarded but not entirely stopped, but if the lever 9 be pulled rearwardly to the limit of its movement, the shoes 18 will be forced against the ground with sufficient pressure to lift the cycle driving wheel from the ground, as shown in Fig. 1, and the travel will then of course stop. In this position the rider may dismount without any inconvenience or discomfort and the wheel may be left without any fear of its falling. When it is desired to again use the wheel, the rider may mount without throwing the operating lever forward and, having mounted and engaged the pedals, may then swing the lever forward so as to lift the shoes from the ground and start the forward movement of the bicycle without any trouble. When the device is applied to a motor cycle, the rider may start his motor and then swing the lever 9 far enough to lower the rear wheel to the ground while retaining the shoes in contact with the ground. The clutch can then be thrown into operative position so that the machine will start with the shoes dragging so that no effort will be needed to preserve the equilibrium until headway has been acquired.

In Figs. 5 and 6, I show a simpler method of mounting the controlling lever. Instead of the segmental frame 2, a bar 30 is secured to the cycle frame and the lever 31 is fulcrumed on this bar, while a plate 32 is secured to the perch of the cycle. This plate 32 is constructed with a longitudinal slot 33 through which the lever projects and notches 34 are formed in one wall of said slot to retain the lever in its adjusted position.

My device is exceedingly simple in its construction and arrangement of its parts, may be applied to any cycle having a conventional frame, may be easily modified in minor details to be fitted to other frames, and may be operated by the rider without any liability of the operation causing the bicycle to fall.

Having thus described the invention, what is claimed as new is:

1. A device for the purpose set forth comprising a segmental frame consisting of mating members having central elongated offset portions together forming a lever-receiving slot and semi-circular portions near their ends to fit around the members of a cycle frame, a lever fulcrumed upon the lower end of said frame and extending upwardly through said slot therein, means for locking the lever to the frame in a set position, hangers mounted for swinging movement in rear of the lever, and a connection between the lever and the hangers.

2. A device for the purpose set forth comprising hangers pivotally connected at their upper ends with a cycle frame, ground-engaging shoes secured to the lower ends of the hangers, forwardly projecting arms on said hangers between the upper and lower ends of the same, a lever mounted on the cycle frame in advance of the hangers, and a fork adapted to pass around a cycle wheel and having its rear end pivoted to the said forwardly projecting arms on the hangers and its front end pivoted to the lower end of the lever.

In testimony whereof I affix my signature.

HARRY REID. [L. S.]

Copies of this patent may be obtained for five cents each, by addressing the "Commissioner of Patents, Washington, D. C."